(12) United States Patent
Bharadwaj et al.

(10) Patent No.: US 11,589,336 B2
(45) Date of Patent: Feb. 21, 2023

(54) TWO-STAGE PHYSICAL SIDELINK CONTROL CHANNEL RESOURCE RESERVATION

(71) Applicant: QUALCOMM Incorporated, San Diego, CA (US)

(72) Inventors: Arjun Bharadwaj, Cupertino, CA (US); Tien Viet Nguyen, Bridgewater, NJ (US); Kapil Gulati, Hillsborough, NJ (US); Sudhir Kumar Baghel, Hillsborough, NJ (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 197 days.

(21) Appl. No.: 16/863,367

(22) Filed: Apr. 30, 2020

(65) Prior Publication Data
US 2020/0351857 A1 Nov. 5, 2020

Related U.S. Application Data

(60) Provisional application No. 62/843,281, filed on May 3, 2019.

(51) Int. Cl.
*H04W 72/04* (2023.01)

(52) U.S. Cl.
CPC .............................. *H04W 72/0406* (2013.01)

(58) Field of Classification Search
USPC .... 370/230, 230.1, 236, 252, 329, 330, 345, 370/348, 431, 436, 437, 468
See application file for complete search history.

(56) References Cited

U.S. PATENT DOCUMENTS

| 10,084,712 | B1* | 9/2018 | Li | H04L 43/026 |
|---|---|---|---|---|
| 11,215,715 | B2* | 1/2022 | Chae | G01S 19/25 |
| 2006/0067315 | A1* | 3/2006 | Tan | H04L 69/18 370/395.5 |
| 2007/0127464 | A1* | 6/2007 | Jain | H04L 45/028 370/389 |
| 2017/0104609 | A1* | 4/2017 | McNamee | H04W 4/24 |
| 2019/0356451 | A1* | 11/2019 | Zhang | H04B 17/327 |

(Continued)

OTHER PUBLICATIONS

International Preliminary Report on Patentability—PCT/US2020/030964, The International Bureau of WIPO—Geneva, Switzerland, dated Nov. 18, 2021.

(Continued)

*Primary Examiner* — Nguyen H Ngo
(74) *Attorney, Agent, or Firm* — Harrity & Harrity, LLP

(57) ABSTRACT

Various aspects of the present disclosure generally relate to wireless communication. In some aspects, a user equipment (UE) may determine a set of resource candidates in a sidelink communication system based at least in part on a set of resource assignments for a group of other UEs in the sidelink communication system. The UE may transmit a first part of a physical sidelink control channel (PSCCH) transmission. The UE may transmit a second part of the PSCCH transmission related to the first part of the PSCCH transmission to indicate a resource candidate, of the set of resource candidates, for a transmission associated with medium access control (MAC) protocol data units (PDUs) of a particular packet. Numerous other aspects are provided.

30 Claims, 10 Drawing Sheets

(56) References Cited

U.S. PATENT DOCUMENTS

| | | | | |
|---|---|---|---|---|
| 2020/0099474 | A1* | 3/2020 | Wikström | H04L 1/1864 |
| 2020/0229171 | A1* | 7/2020 | Khoryaev | H04B 7/0413 |
| 2020/0288486 | A1* | 9/2020 | Kwak | H04L 5/0053 |
| 2020/0295883 | A1* | 9/2020 | Lee | H04L 1/1887 |
| 2020/0304247 | A1* | 9/2020 | Loehr | H04W 4/40 |
| 2020/0305127 | A1* | 9/2020 | Huang | H04L 5/0007 |
| 2021/0127361 | A1* | 4/2021 | Yasukawa | H04W 72/0406 |
| 2021/0204250 | A1* | 7/2021 | Ashraf | H04W 76/14 |
| 2021/0219268 | A1* | 7/2021 | Li | H04L 1/08 |
| 2021/0243749 | A1* | 8/2021 | Hoang | H04W 74/085 |
| 2021/0392618 | A1* | 12/2021 | Hedayat | H04W 72/1278 |

OTHER PUBLICATIONS

Intel Corporation: "Sidelink Resource Allocation Design for NR V2X Communication", 3GPP TSG RAN WG1 Meeting #96bis, 3GPP Draft; R1-1904296 INTEL—EV2X_SL_M2, 3rd Generation Partnership Project (3GPP), Mobile Competence Centre; 650, Route Des Lucioles; F-06921 Sophia-Antipolis Cedex; France, vol. RAN WG1, No. Xi 'an, China; Apr. 8, 2019-Apr. 12, 2019, Apr. 3, 2019 (Apr. 3, 2019), 15 Pages, XP051707175, Retrieved from the Internet: URL: http://www.3gpp.org/ftp/tsg%5Fran/WG1%5FRL1/TSGR1%5F96b/Docs/R1%2D1984296%2Ezip[retrieved on Apr. 3, 2019] paragraphs [02.6]-[02.8].

International Search Report and Written Opinion—PCT/US2020/030964—ISA/EPO—dated Aug. 14, 2020.

Qualcomm Incorporated; "Sidelink Resource Allocation Mechanism for NR V2X", 3GPP TSG RAN WG1 #96bis, 3GPP Draft; R1-1905009 Sidelink Resource Allocation Mechanism for NR V2X, 3rd Generation Partnership Project (3GPP), Mobile Competence Centre; 650, Route Des Lucioles; F-06921 Sophia-Antipolis Cedex, vol. RAN WG1, No. Xi 'an, China; Apr. 8, 2019-Apr. 12, 2019, Apr. 7, 2019 (Apr. 7, 2019), 11 Pages, XP051700124, Retrieved from the Internet: URL: http://www.3gpp.org/ftp/Meetings%5F3GPP%5FSYNC/RAN1/Docs/R1%2D1905009%2Ezip [retrieved on Apr. 7, 2019] paragraph [0001], paragraph [0005], paragraph [0006].

* cited by examiner

TWO-STAGE PHYSICAL SIDELINK CONTROL CHANNEL RESOURCE RESERVATION

CROSS-REFERENCE TO RELATED APPLICATION

This patent application claims priority to U.S. Provisional Patent Application No. 62/843,281, filed on May 3, 2019, entitled "TWO-STAGE PHYSICAL SIDELINK CONTROL CHANNEL RESOURCE RESERVATION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for two-stage physical sidelink control channel (PSCCH) resource reservation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining a set of resource candidates in a sidelink communication system based at least in part on a set of resource assignments for a group of other UEs in the sidelink communication system; transmitting a first part of a physical sidelink control channel (PSCCH) transmission; and transmitting a second part of the PSCCH transmission related to the first part of the PSCCH transmission to indicate a resource candidate, of the set of resource candidates, for a transmission associated with medium access control (MAC) protocol data units (PDUs) of a particular packet.

In some aspects, a UE for wireless communication may include memory and one or more processors operatively coupled to the memory. The memory and the one or more processors may be configured to determine a set of resource candidates in a sidelink communication system based at least in part on a set of resource assignments for a group of other UEs in the sidelink communication system; transmit a first part of the PSCCH transmission; and transmit a second part of the PSCCH transmission related to the first part of the PSCCH transmission to indicate a resource candidate, of the set of resource candidates, for a transmission associated with MAC PDUs of a particular packet.

In some aspects, a non-transitory computer-readable medium may store one or more instructions for wireless communication. The one or more instructions, when executed by one or more processors of a UE, may cause the one or more processors to: determine a set of resource candidates in a sidelink communication system based at least in part on a set of resource assignments for a group of other UEs in the sidelink communication system; transmit a first part of the PSCCH transmission; and transmit a second part of the PSCCH transmission related to the first part of the PSCCH transmission to indicate a resource candidate, of the set of resource candidates, for a transmission associated with MAC PDUs of a particular packet.

In some aspects, an apparatus for wireless communication may include means for determining a set of resource candidates in a sidelink communication system based at least in part on a set of resource assignments for a group of other UEs in the sidelink communication system; means for transmitting a first part of the PSCCH transmission; and means for transmitting a second part of the PSCCH transmission related to the first part of the PSCCH transmission to indicate a resource candidate, of the set of resource candidates, for a transmission associated with MAC PDUs of a particular packet.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art.

Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is to be noted that while aspects may be described herein using terminology commonly associated with 3G and/or 4G wireless technologies, aspects of the present disclosure can be applied in other generation-based communication systems, such as 5G and later, including NR technologies.

Figure 1:
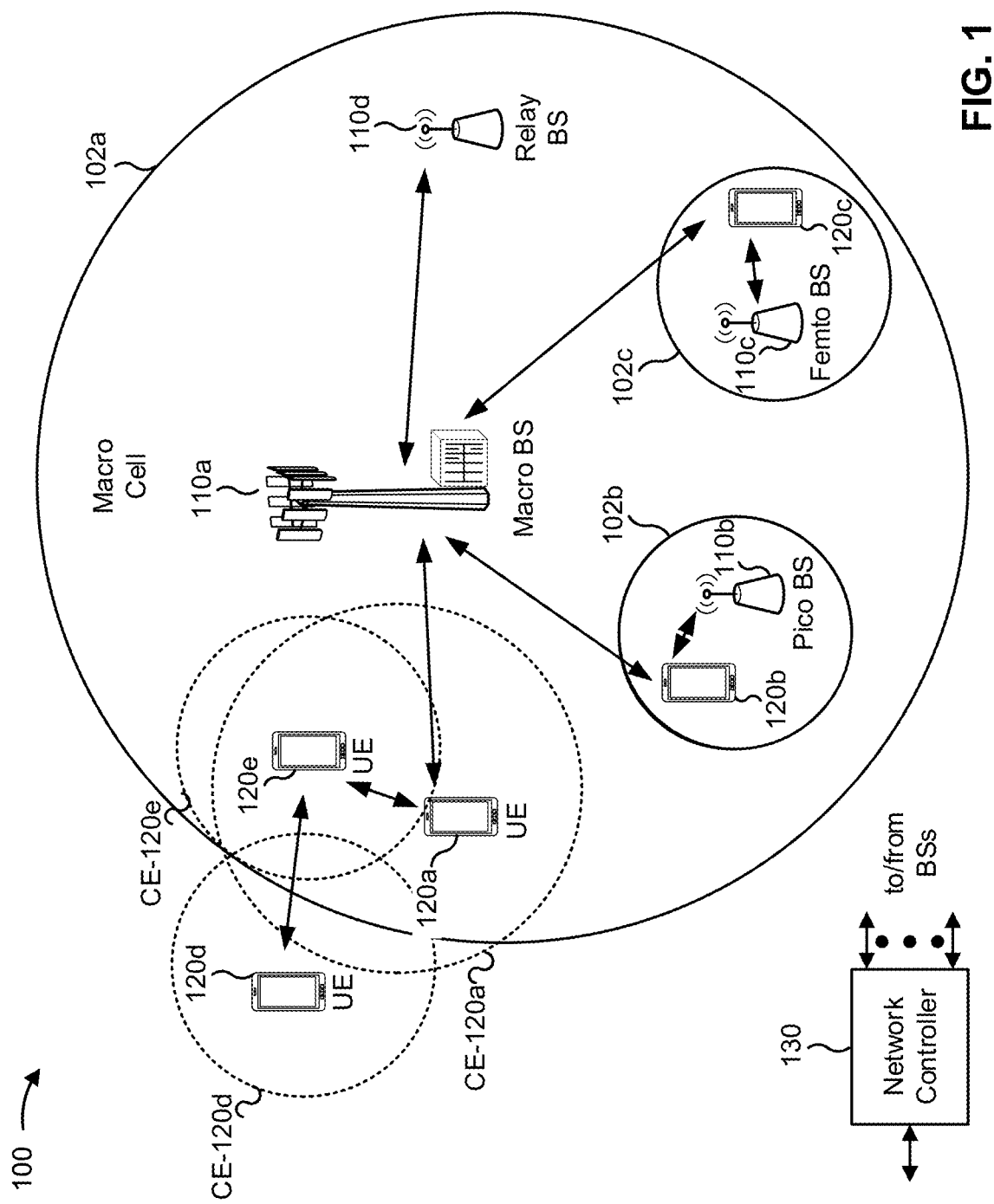
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and one or more UEs to facilitate communication between BS 110a and the one or more UEs. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a, UE 120d, UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

In some aspects, each UE 120 may be associated with a control exclusion (CE) zone. For example, UE 120a may be associated with CE-120a, UE 120d may be associated with CE-120d, and UE 120e may be associated with CE-120e. The CE zones may define zones in which resources reserved by a respective UE 120 are not to be used by other UEs 120, as described in more detail herein.

A UE may be configured to determine available resources based at least in part on a CE zone. A given UE transmits CE zone information (e.g., information that defines the CE zone associated with the given UE) in a control channel (e.g., a physical sidelink control channel (PSCCH)) along with, for example, a resource candidate. All UEs receiving a control channel may therefore decode the control channel in order to determine (and maintain) a resource assignment map based at least in part on resource candidates and indicated CE zones. One issue with the use of CE zones is that if there are many UEs reserving resources, the channel can become congested to a point that there are not enough resources available to use for a transmission. This can lead to significant delay, which may result in violation of a delay budget associated with a given packet.

Real-world applications of such sidelink communications with CE zones may include public safety, proximity services, UE-to-network relaying, V2V communications, V2I communications, V2X communications, Internet of Everything (IoE) communications, IoT communications, mission-critical mesh, and/or various other suitable applications. Generally, a sidelink signal of a sidelink channel may refer to a signal communicated from one subordinate entity (e.g., a UE 120) to another subordinate entity (e.g., a UE 120) without relaying that communication through a scheduling entity (e.g., a BS 110), even though the scheduling entity may be utilized for scheduling and/or control purposes. In some aspects, the sidelink signals may be communicated using a licensed spectrum, an unlicensed spectrum, and/or the like.

As indicated above, FIG. 1 is provided as an example. Other examples may differ from what is described with regard to FIG. 1.

Figure 2:
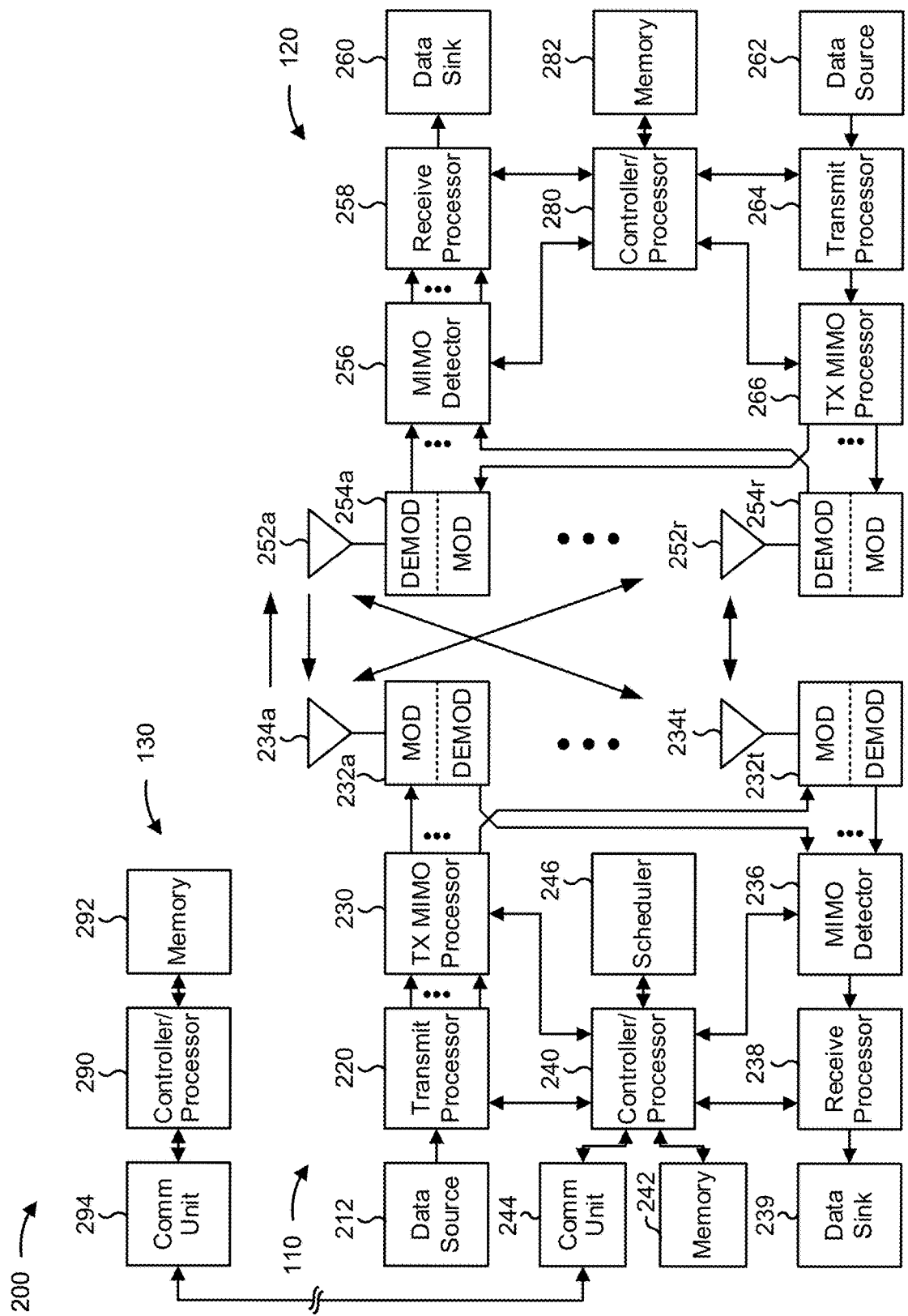
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with two-stage PSCCH resource reservation, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining a set of resource candidates in a sidelink communication system based at least in part on a set of resource assignments for a group of other UEs in the sidelink communication system, means for transmitting a first part of a physical sidelink control channel (PSCCH) transmission, means for transmitting a second part of the PSCCH transmission related to the first part of the PSCCH transmission to indicate a resource candidate, of the set of resource candidates, for a transmission associated with medium access control (MAC) protocol data units (PDUs) of a particular packet, and/or the like. In some aspects, such means may include one or more components of UE 120 described in connection with FIG. 2.

As indicated above, FIG. 2 is provided as an example. Other examples may differ from what is described with regard to FIG. 2.

Figure 3A:
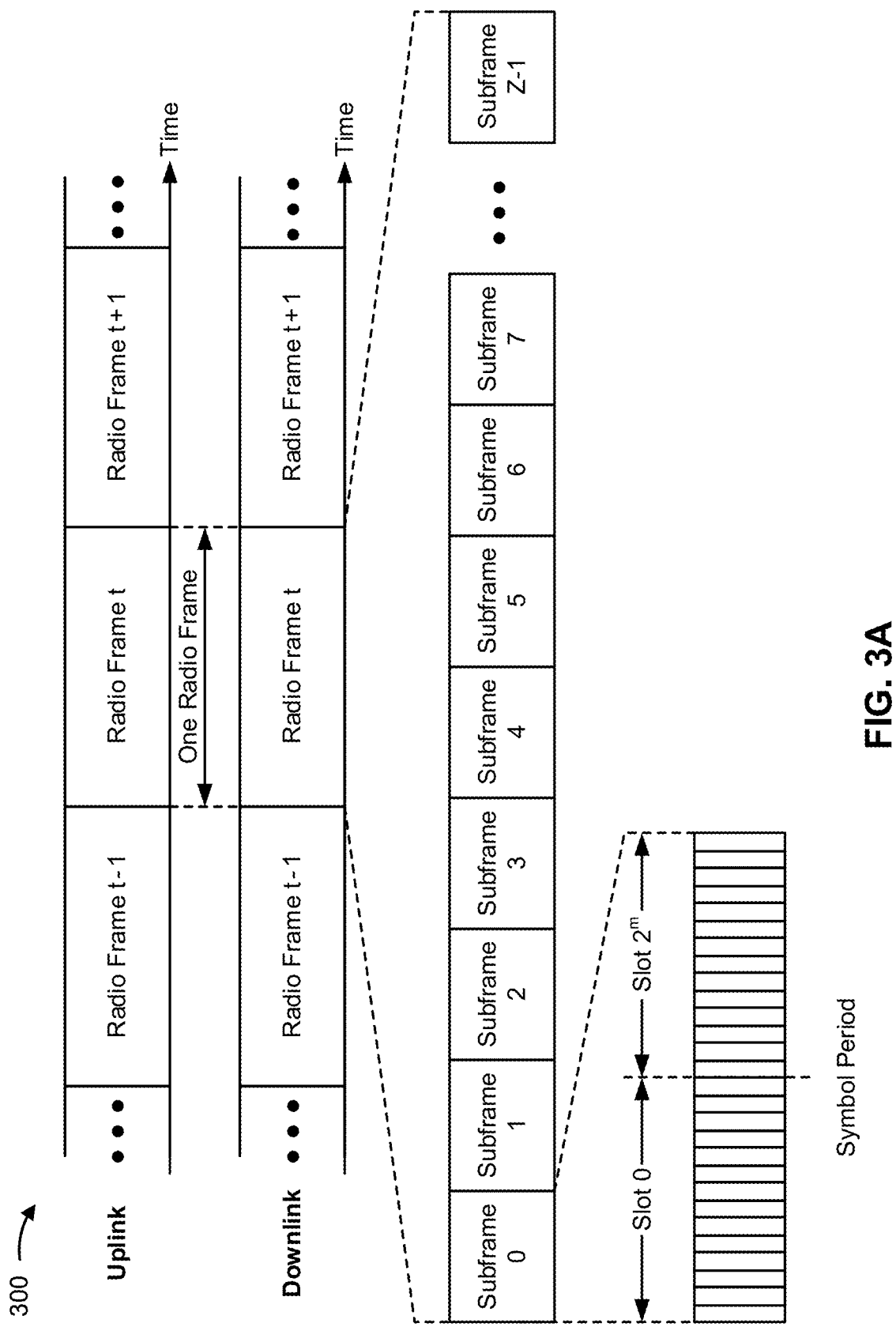
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
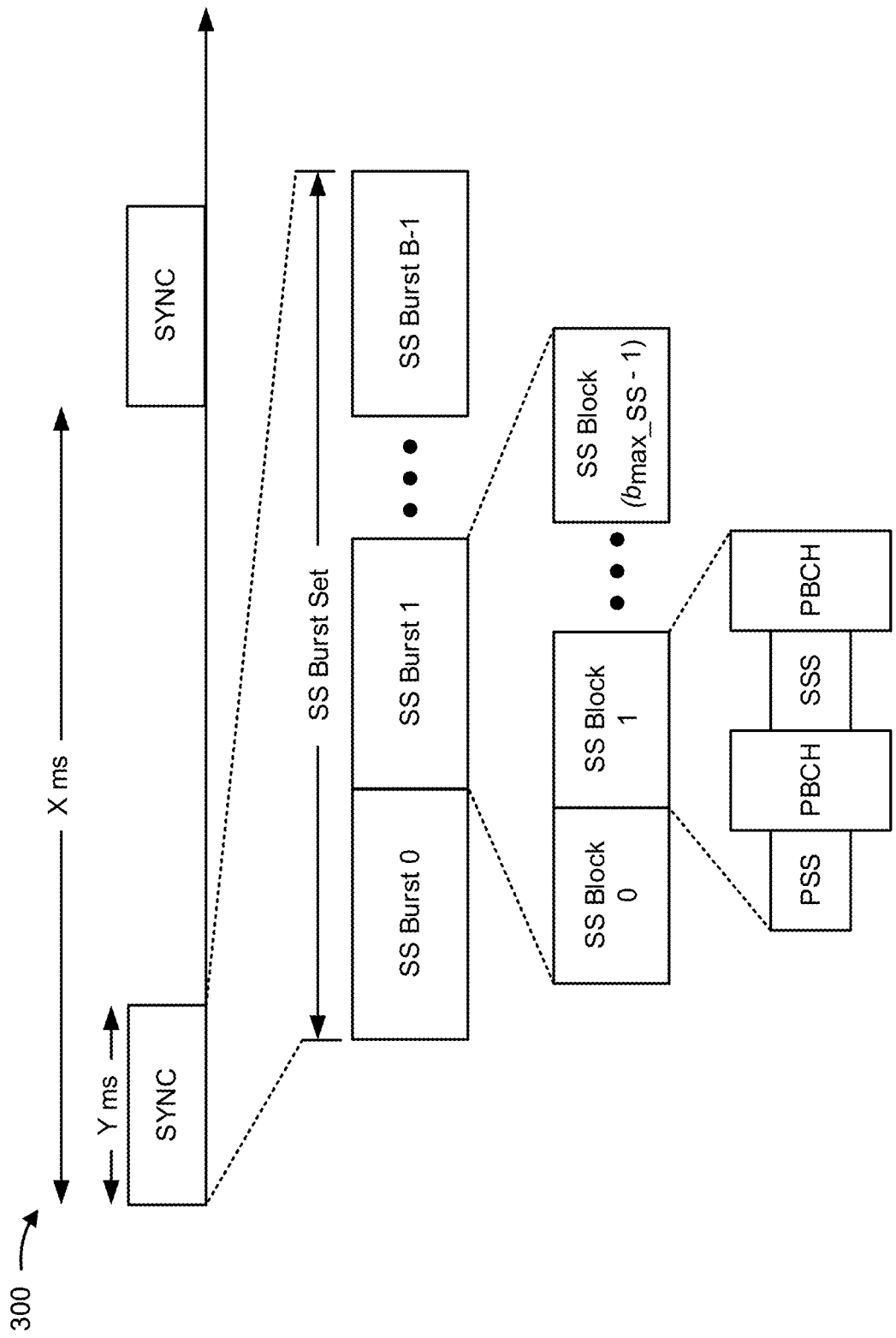
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}-1$), where $b_{max\_SS}-1$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
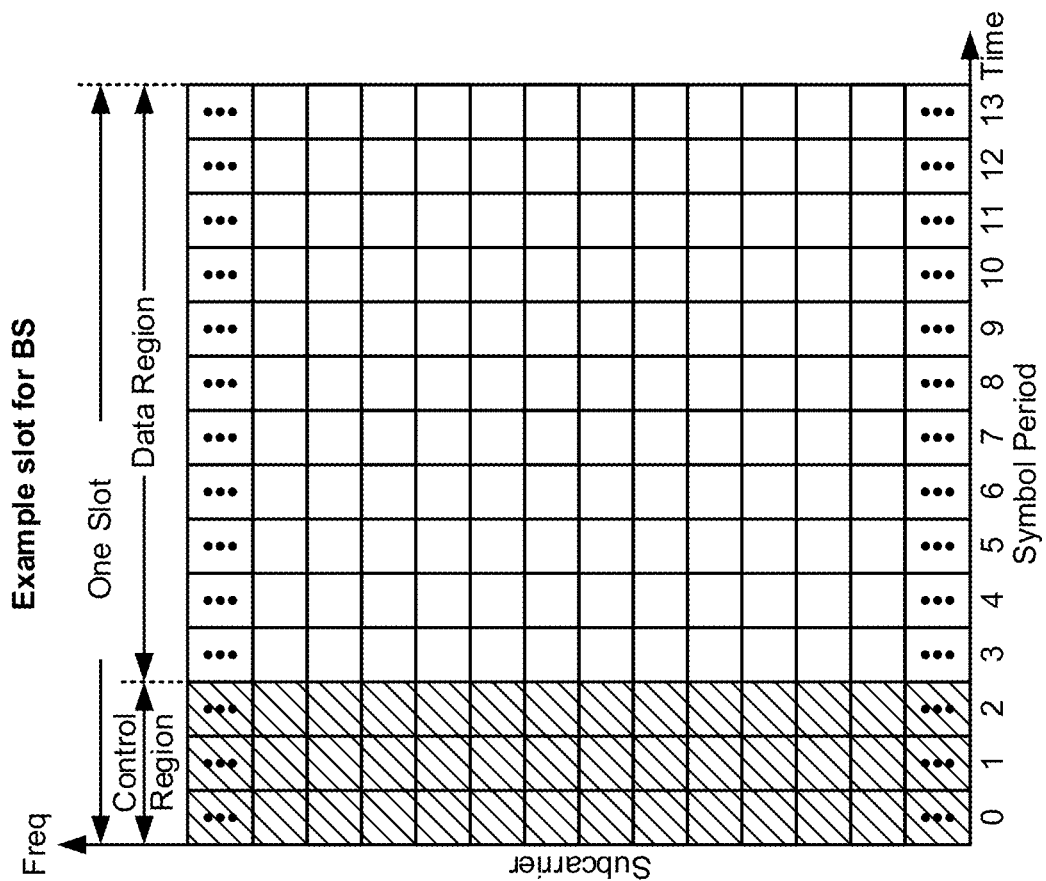
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

In some communications systems, such as NR, UEs may communicate with other UEs using sidelink communications. For example, in an NR vehicle-to-everything (V2X) communications system, a first UE may transmit to a second UE, and the second UE may transmit to the first UE using a distributed channel access mechanism. In a distributed channel access mechanism, resource assignment is performed without a central scheduling unit providing scheduling information. For example, UEs may perform contention based channel access procedures, such as a listen-before-talk (LBT) based channel access procedure.

A UE may take into account delay budgets associated with a given packet, such as a packet delay budget (PDB) and a hybrid automatic repeat request (HARD) delay budget (HDB), when performing contention based access. A PDB is a constraint dictating a maximum delay between a time of packet arrival and a time of a last transmission of the packet. For example, each packet that arrives at a transmitter of a UE for transmission by the transmitter is associated with a PDB and a quantity of transmissions (a quantity of times that the packet is to be transmitted). The PDB and the quantity of transmissions may vary among packets depending on, for example, an application or a service associated with the packet (e.g., in order to achieve a desired coverage, range, reliability, and/or the like). An HDB is a constraint dictating a maximum delay between a first transmission associated with the packet and a last transmission associated with the packet.

A UE may be configured to determine available resources based at least in part on a control exclusion (CE) zone. A CE zone is defined as an area where a resource exclusion is applied and reserved resources are avoided (e.g., such that the reserved resources are not selected for transmission). A given UE transmits CE zone information (e.g., information that defines the CE zone associated with the given UE) in a control channel (e.g., a physical sidelink control channel (PSCCH)) along with, for example, a resource candidate. A CE zone can be, for example, signal-based (e.g., based at least in part on a reference signal received power (RSRP) or the like) or distance-based (e.g., based at least in part on a radial distance in, for example, meters). All UEs receiving the control channel may therefore decode the control channel in order to determine (and maintain) a resource assignment map based at least in part on resource candidates and indicated CE zones.

One issue with the use of CE zones is that if there are many UEs reserving resources, the channel can become congested to a point that there are not enough resources available to use for a transmission. This can lead to significant delay, which may result in violation of a delay budget associated with a given packet. After receipt of a packet, a UE may identify a contention window and a set of resource candidates associated with a set of CE zones, and may attempt to identify resources for reservation.

Some techniques and apparatuses described herein provide for two-stage PSCCH resource reservation. For example, a UE may determine a set of resource candidates in a sidelink communication system based at least in part on a set of resource assignments for a group of other UEs (e.g., in a CE zone that includes the UE). In this case, the UE may transmit a first part of the PSCCH transmission and a second part of the PSCCH transmission to reserve resources for transmitting medium access control (MAC) protocol data units (PDUs) of a particular packet. The first part of the PSCCH transmission and the second part of the PSCCH transmission may be defined as a first part of the PSCCH stage and a second part of the PSCCH stage, respectively, for a resource candidate that may be assigned for the particular packet. In this way, the UE enables resource reservation in, for example, a V2X communications system in accordance with a PDB constraint and an HDB constraint, as described in more detail herein.

Figure 5A:
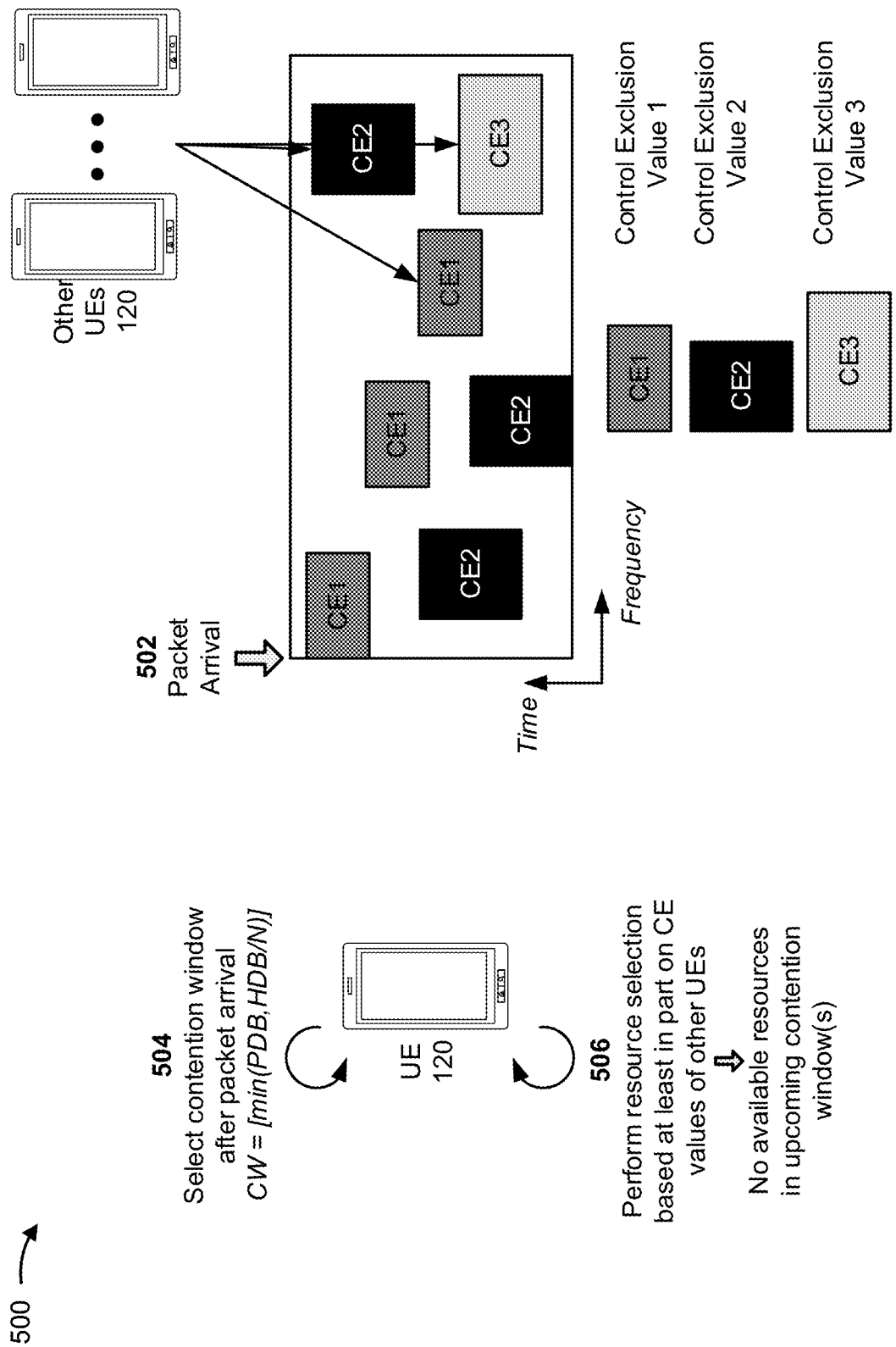
FIGS. 5A-5C are diagrams illustrating an example of two-stage PSCCH resource reservation, in accordance with various aspects of the present disclosure.
Figure 5B:
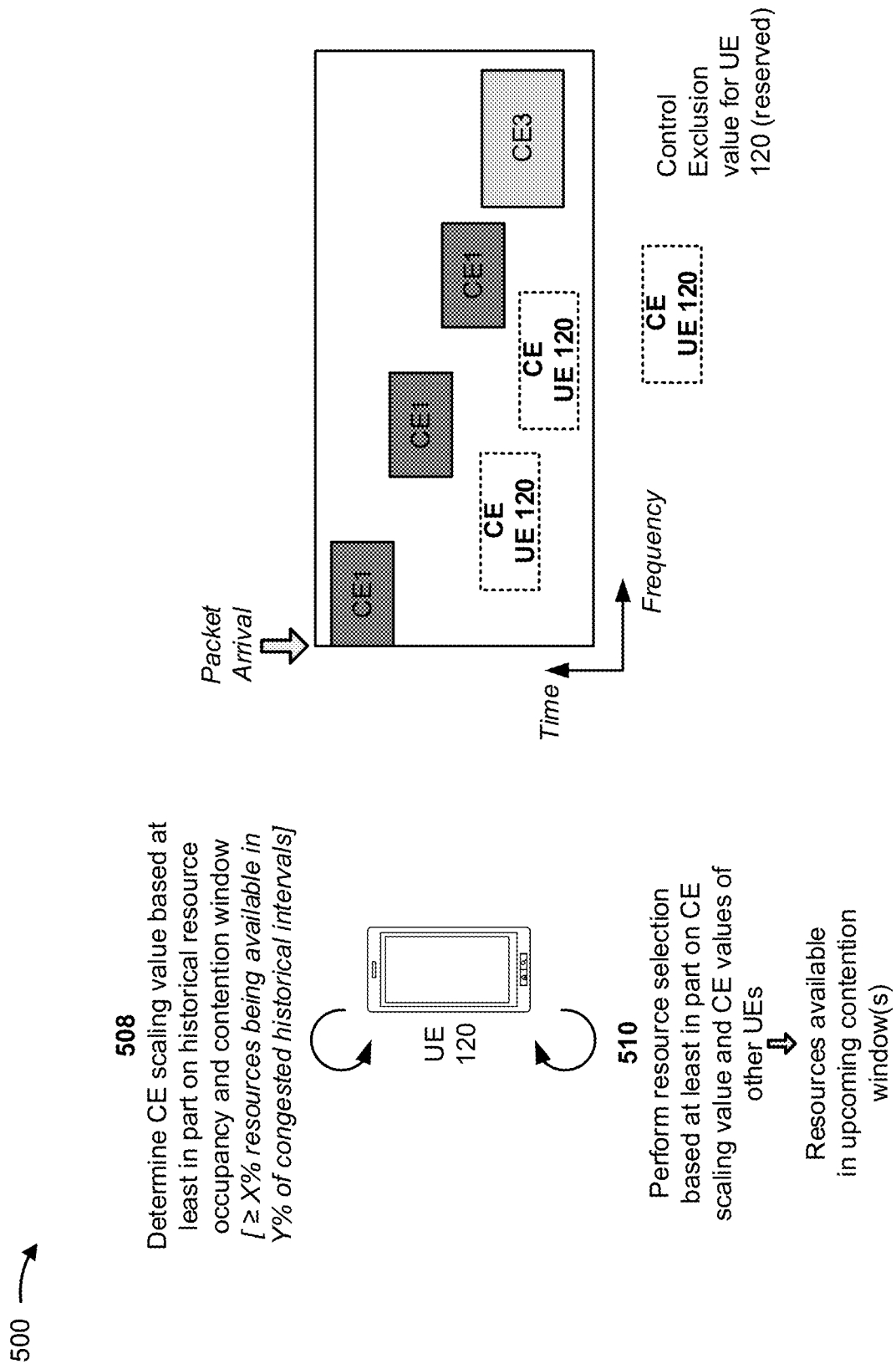
Figure 5C:
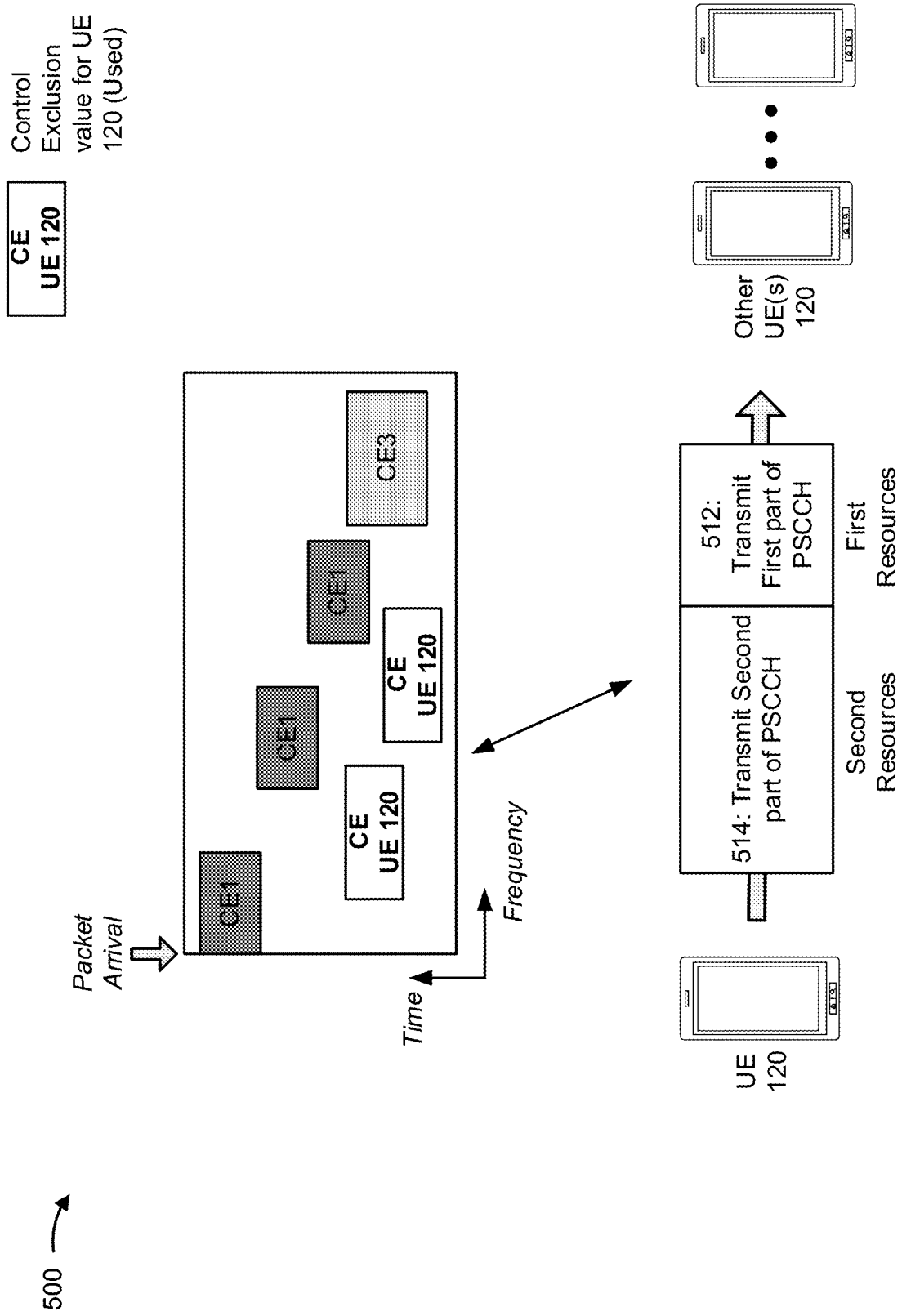

FIGS. 5A-5C are diagrams illustrating an example 500 of PSCCH resource reservation. As shown in FIGS. 5A-5C, example 500 may include a first UE 120 that is to communicate in a network that includes one or more second UEs 120 (also referred to as "other" UEs 120).

As further shown in FIG. 5A, and by reference number 502, UE 120 (e.g., using antenna 252, DEMOD 254, MIMO detector 256, receive processor 258, controller/processor 280, and/or the like) may receive a packet at a particular time. For example, UE 120 may receive the packet at a transmitter of UE 120 for transmission by the transmitter of UE 120. The packet may be associated with a PDB, an HDB, and a quantity of retransmissions (e.g., an initial transmission, a set of retransmissions, and/or the like) that are to be performed. For example, the packet may be associated with a PDB of 100 milliseconds (ms), an HDB of 32 ms, and a quantity of retransmissions (N) of 4.

As further shown in FIG. 5A, and by reference number 504, UE 120 (e.g., using controller/processor 280 and/or the like) may select a contention window. For example, UE 120 may select the contention window based at least in part on the PDB, the HDB, the quantity of retransmissions, and/or the like. In this case, a size of the contention window may be determined as CW=minimum (PDB, HBD)/(N/K) where K is a quantity of packets being reserved. In some aspects, UE 120 may sweep within the PDB to determine resources. For example, within the PDB, UE 120 may iteratively set the contention window, determine whether resources are available in the contention window as described below and, if resources are unavailable, change the contention window and determine whether resources are available in the changed contention window. In this case, a size of the contention window may remain static, but the contention window may be moved in time with respect to the PDB.

In some aspects, UE 120 may determine that an earliest possible contention window (position within the PDB) in which a threshold quantity of resources (e.g., a sufficient quantity of resources for transmitting the packet) is available is greater than a threshold quantity of slots from receiving the packet. For example, UE 120 may determine that within a threshold period of time, there is not a contention window in which UE 120 can reserve resources to transmit each retransmission of the packet. In this case, UE 120 may adjust a CE value, as described below, and attempt to determine available resources within the contention window again as described above.

As shown by reference number 506, UE 120 (e.g., using controller/processor 280 and/or the like) may attempt to perform resource selection based at least in part on CE values of one or more other UEs 120. For example, UE 120 may identify a set of resource assignments of one or more other UEs 120, such as a set of resource assignments of a first UE (e.g., identified by a first CE zone, CE1), a set of resource assignments of a second UE (e.g., identified by a second CE zone, CE2), a set of resource assignments of a third UE (e.g., identified by a third CE zone, CE3), and/or the like.

In some aspects, UE 120 may select available resources within the contention window (and if resources are unavailable, UE 120 may move the contention window and attempt to select resources within the moved contention window). For example, UE 120 may eliminate reserved resources, and may determine if a remaining set of resources is sufficient to transmit the packet. In some aspects, UE 120 may select resources based at least in part on a priority, a reference signal received power (RSRP), and/or the like associated with other UEs that have attempted to reserve resources. For example, UE 120 may select reserved resources associated with less than a threshold RSRP (e.g., thereby having less than a threshold likelihood of resulting in interference) or resources reserved by UEs with less than a threshold priority (e.g., a priority lower than a priority of UE 120). In some aspects, UE 120 may perform a random resource selection procedure from among available resources. In some aspects, as shown, however, UE 120 may determine that there are not available resources for transmitting the packet in the contention window at any position with respect to the PDB.

As shown in FIG. 5B, and by reference number 508, UE 120 (e.g., using controller/processor 280 and/or the like) may determine to scale the CE zones based at least in part on a CE scaling value. For example, UE 120 may linearly scale the CE value based at least in part on a CE scaling value. For example, UE 120 may scale the CE zones by a particular percentage without accounting for historical data regarding previous contention windows. In some aspects, the particular percentage may be configurable. In some aspects, UE 120 may select a new contention window (e.g., of a same size) and sweep the new contention window (e.g., iteratively check resource availability at each possible position of the contention window with respect to the PDB) to determine another available window to transmit the first part of the PSCCH transmission and the second part of the PSCCH transmission.

In some aspects, UE 120 may determine the CE scaling value based at least in part on historical resource occupancy in previous contention windows. In this case, UE 120 may determine a scaling value such that greater than a threshold percentage of resources (X %) would be available in a threshold percentage (Y %) of a previous set of most congested historical intervals. In other words, UE 120 may determine a CE scaling value that, if applied to a previous congested contention window, would have resulted in sufficient resources being available for reservation to transmit the packet, and thus, is associated with a threshold likelihood of causing sufficient resources to be available in a next contention window for reservation to transmit the packet.

As further shown in FIG. 5B, and by reference number 510, UE 120 (e.g., controller/processor 280 and/or the like) may perform resource selection based at least in part on the CE scaling value and based at least in part on the CE zones of other UEs. For example, when the CE scaling value is applied to CE zones of other UEs, the second CE zone, CE2, no longer includes UE 120, thereby making resources available for reservation by UE 120. In this case, based at least in part on determining that resources are available in an upcoming contention window, UE 120 may determine a set of resources (identified as CE UE 120) that are available for transmitting the packet.

As shown in FIG. 5C, and by reference number 512, based at least in part on identifying resources for reservation in a contention window, UE 120 (e.g., using controller/processor 280, transmit processor 264, TX MIMO processor 266, MOD 254, antenna 252, and/or the like) may transmit a first part of the PSCCH transmission to indicate a first resource candidate including first resources. For example, UE 120 may transmit the first part of the PSCCH transmission to one or more other UEs 120 to indicate that UE 120 is reserving a first resource for transmission of payload data associated with a particular packet (identified by CE UE 120).

In some aspects, UE 120 may omit payload data from the first part of the PSCCH transmission. For example, UE 120 may transmit the first part of the PSCCH transmission with an indicator to indicate that the first part of the PSCCH transmission does not include payload data. In some aspects, UE 120 may indicate other information in the first part of the PSCCH transmission, such as a demodulation reference signal (DMRS) pattern that is to be used. In some aspects, UE 120 may indicate another resource candidate after the first resource candidate. For example, UE 120 may indicate a future resource candidate in the first part of the PSCCH transmission.

In some aspects, UE 120 may transmit the first part of the PSCCH transmission with a particular set of transmission characteristics. For example, UE 120 may transmit the first part of the PSCCH transmission with a relatively low code rate (e.g., less than a threshold code rate) to increase an effective transmission distance. In some aspects, UE 120 may transmit the first part of the PSCCH transmission with transparent transmit diversity. For example, UE 120 may utilize transmit diversity for the first part of the PSCCH transmission to increase reliability of a transmission of the first part of the PSCCH transmission. Additionally, or alternatively, UE 120 may transmit the first part of the PSCCH with a type 4 comb pattern (Comb-4) reference signal.

As further shown in FIG. 5C, and by reference number 514, UE 120 (e.g., using controller/processor 280, transmit processor 264, TX MIMO processor 266, MOD 254, antenna 252, and/or the like) may transmit a second part of the PSCCH transmission identifying a second resource candidate including second resources. For example, UE 120 may transmit the second part of the PSCCH transmission to reserve second resources (identified by CE UE 120) for retransmission of the same packet as is to be transmitted using the first resource candidate of the first part of the PSCCH transmission. The second part of the PSCCH transmission may be a second part of a single transmission comprising the first part of the PSCCH transmission and the second part of the PSCCH transmission. For example, the first part of the PSCCH transmission may be a first 3 symbols of the transmission (e.g., a control portion of the transmission) and the second part of the PSCCH transmission may be a remaining set of one or more symbols of the transmission (e.g., a data portion of the transmission). In this case, the first part of the PSCCH transmission and the second part of the PSCCH transmission may be in a single slot of, for example, a single contention window.

In some aspects, UE 120 may transmit the second part of the PSCCH transmission to reserve resources for an initial transmission of the same packet. For example, when the first resource candidate is not large enough to convey the entire packet, UE 120 may transmit the first part of the PSCCH transmission to reserve first resources for a first portion of the packet and the second part of the PSCCH transmission to reserve second resources for a second portion of the packet.

In some aspects, UE 120 may transmit the second part of the PSCCH transmission to reserve resources for one or more other packets. For example, UE 120 may include a third resource candidate in the second part of the PSCCH transmission to reserve third resources to convey MAC PDUs associated with a same radio link control (RLC) PDU as the packet that is to be conveyed using the first resources and the second resources.

In some aspects, UE 120 may transmit the second part of the PSCCH transmission with a particular set of transmission characteristics. For example, UE 120 may use the same data DMRS for channel estimation with the second part of the PSCCH transmission as UE 120 transmitted with the first part of the PSCCH transmission. Additionally, or alternatively, UE 120 may use a same precoding type as for payload of the second part of the PSCCH transmission, of the first part of the PSCCH, and/or the like. In some aspects, UE 120 may use a low code rate (e.g., less than a threshold code rate) for the second part of the PSCCH. For example, when UE 120 transmits the second part of the PSCCH using a resource candidate for transmitting MAC PDUs of the particular packet and using another resource candidate for transmitting other MAC PDUs associated with an RLC PDU as for the particular packet, UE 120 may use less than a threshold code rate for transmitting the second part of the PSCCH. Similarly, in such a case, UE 120 may use a link budget within a threshold amount as for the first part of the PSCCH when transmitting the second part of the PSCCH to reserve resources for the MAC PDUs and the other MAC PDUs. In some aspects, UE 120 may transmit the second part of the PSCCH in resources immediately after resources used for the first part of the PSCCH.

In some aspects, UE 120 may multiplex a portion of the second part of the PSCCH transmission. For example, when UE 120 transmits the second part of the PSCCH with payload data, UE 120 may multiplex the second part of the PSCCH with the payload data. In this case, UE 120 may determine a transport block size based at least in part on a total quantity of resource elements that are to be used for a retransmission of the payload data. In some aspects, UE 120 may transmit the second part of the PSCCH transmission without data and may include padding bits with the second part of the PSCCH transmission. For example, UE 120 may generate a set of padding pits to cause the second part of the PSCCH transmission to occupy an entire slot during transmission. In this case, UE 120 may use a same frequency allocation for the second part of the PSCCH transmission as was used for the first part of the PSCCH transmission. Additionally, or alternatively, UE 120 may transmit the payload data in another transmission associated with a threshold separation from the second part of the PSCCH transmission.

In some aspects, UE 120 may include information associated with payload data and/or feedback information in the second part of the PSCCH transmission. For example, UE 120 may include an indicator of a modulation and coding scheme (MCS), a transmission mode, and/or the like for transmission using the second resources and/or the third resources. Additionally, or alternatively, UE 120 may include a hybrid automatic repeat request (HARM) message to provide feedback. Additionally, or alternatively, UE 120 may provide distance information identifying a control exclusion zone.

In some aspects, a reserved resource may remain assigned to UE 120 until UE 120 transmits using the reserved resource. For example, other UEs 120 may observe the resource candidates used by UE 120. In some aspects, another UE 120 of a higher priority than UE 120 may preempt the resource candidates used by UE 120. In this case, if at a time of transmission of the packet using the reserved resources, the reserved resources are no longer available, UE 120 may reselect resources (e.g., in the same contention window or in another contention window within the PDB) for transmitting the packet.

As indicated above, FIGS. 5A-5C are provided as examples. Other examples may differ from what is described with respect to FIGS. 5A-5C.

Figure 6:
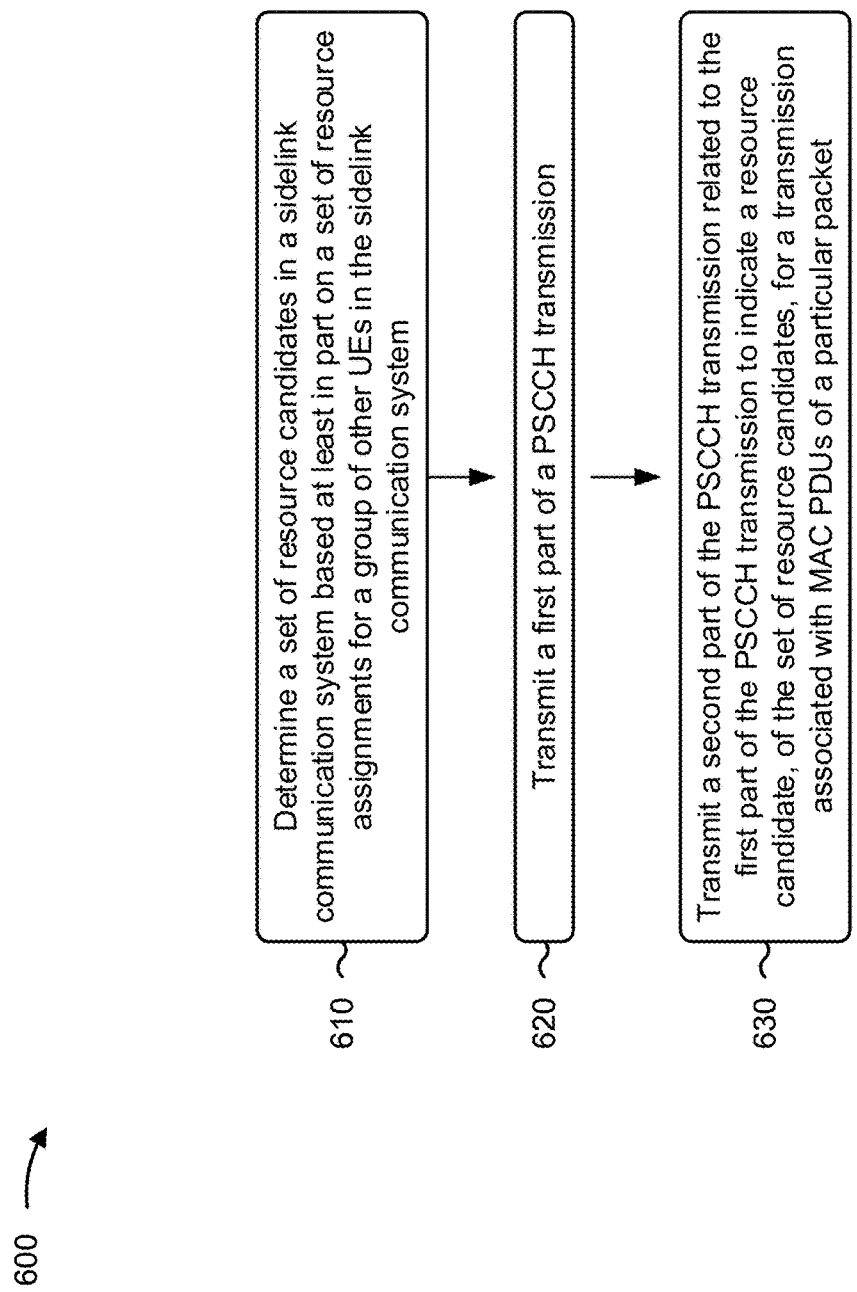
FIG. 6 is a diagram illustrating an example process performed, for example, by a user equipment, in accordance with various aspects of the present disclosure.

FIG. 6 is a diagram illustrating an example process 600 performed, for example, by a UE, in accordance with various aspects of the present disclosure. Example process 600 is an example where the UE (e.g., UE 120 and/or the like) performs operations associated with two-stage PSCCH resource reservation.

As shown in FIG. 6, in some aspects, process 600 may include determining a set of resource candidates in a sidelink communication system based at least in part on a set of resource assignments for a group of other UEs in the sidelink communication system (block 610). For example, the UE (e.g., using receive processor 258, transmit processor 264, controller/processor 280, memory 282, and/or the like) may determine a set of resource candidates in a sidelink communication system based at least in part on a set of resource assignments for a group of other UEs in the sidelink communication system, as described above in FIGS. 5A and 5B and as shown by reference numbers 502 to 510.

As further shown in FIG. 6, in some aspects, process 600 may include transmitting a first part of a PSCCH transmission (block 620). For example, the UE (e.g., using receive processor 258, transmit processor 264, controller/processor 280, memory 282, and/or the like) may transmit a first part of a PSCCH transmission, as described above in FIG. 5C and as shown by reference number 512.

As further shown in FIG. 6, in some aspects, process 600 may include transmitting a second part of the PSCCH transmission related to the first part of the PSCCH transmission to indicate a resource candidate, of the set of resource candidates, for a transmission associated with MAC PDUs of a particular packet (block 630). For example, the UE (e.g., using receive processor 258, transmit processor 264, controller/processor 280, memory 282, and/or the like) may transmit a second part of the PSCCH transmission related to the first part of the PSCCH transmission to indicate a resource candidate, of the set of resource candidates, for a transmission associated with MAC PDUs of a particular packet, as described above in FIG. 5C and as shown by reference number 514.

Process 600 may include additional aspects, such as any single aspect or any combination of aspects described below and/or in connection with one or more other processes described elsewhere herein.

In a first aspect, the first part of the PSCCH transmission indicates another resource candidate, of the set of resource candidates, for the transmission associated with the particular packet.

In a second aspect, alone or in combination with the first aspect, the first part of the PSCCH transmission is a first PSCCH stage and the second part of the PSCCH transmission is a second PSCCH stage.

In a third aspect, alone or in combination with one or more of the first and second aspects, the first part of the PSCCH transmission does not include payload data and includes an indication that the first part of the PSCCH transmission does not include payload data.

In a fourth aspect, alone or in combination with one or more of the first through third aspects, the resource candidate of the second part of the PSCCH transmission is for at least one of an initial transmission of the particular packet, both the initial transmission of the particular packet and a retransmission of the particular packet, or only the retransmission of the particular packet.

In a fifth aspect, alone or in combination with one or more of the first through fourth aspects, the second part of the PSCCH transmission includes another resource candidate for other MAC PDUs associated with the same RLC PDU packet as the MAC PDUs of the particular packet.

In a sixth aspect, alone or in combination with one or more of the first through fifth aspects, the first part of the PSCCH transmission includes information identifying at least one of: a demodulation reference signal pattern, a modulation and coding scheme indicator, or a resource candidate.

In a seventh aspect, alone or in combination with one or more of the first through sixth aspects, the second part of the PSCCH transmission includes at least one of payload data, feedback information, a hybrid automatic repeat request indicator, a transmission mode indicator, or a transmission distance identifier.

In an eighth aspect, alone or in combination with one or more of the first through seventh aspects, the first part of the PSCCH transmission is associated with a transmission characteristic, and the transmission characteristic includes one of: less than a threshold code rate, transparent transmit diversity, quadrature phase shift keying modulation, or a type 4 frequency comb pattern reference signal.

In a ninth aspect, alone or in combination with one or more of the first through eighth aspects, the second part of the PSCCH transmission is associated with a transmission characteristic, and the transmission characteristic includes one of: a same data demodulation reference signal as a demodulation reference signal for the first part of the PSCCH transmission for channel estimation, a same precoding type as payload data, or a quadrature phase shift keying modulation.

In a tenth aspect, alone or in combination with one or more of the first through ninth aspects, the second part of the PSCCH transmission includes a third resource candidate and is associated with less than a threshold code rate.

In an eleventh aspect, alone or in combination with one or more of the first through tenth aspects, the second part of the PSCCH transmission includes a third resource candidate and a link budget within a threshold amount of a link budget of the first part of the PSCCH transmission.

In a twelfth aspect, alone or in combination with one or more of the first through eleventh aspects, the second part of the PSCCH transmission is transmitted after or at the same time as the first part of the PSCCH transmission.

In a thirteenth aspect, alone or in combination with one or more of the first through twelfth aspects, the second part of the PSCCH transmission is multiplexed with a data transmission, and a transport block size is based at least in part on a quantity of resource elements used for a retransmission.

In a fourteenth aspect, alone or in combination with one or more of the first through thirteenth aspects, the second part of the PSCCH transmission is not multiplexed with a data transmission, and the second part of the PSCCH transmission includes padding bits to cause the second part of the PSCCH transmission to occupy an entire slot.

In a fifteenth aspect, alone or in combination with one or more of the first through fourteenth aspects, a frequency allocation for the second part of the PSCCH transmission is the same as the frequency allocation for the first part of the PSCCH transmission.

In a sixteenth aspect, alone or in combination with one or more of the first through fifteenth aspects, determining the set of resource candidates includes selecting a contention window, and determining a set of resource candidates for the set of resource assignments based at least in part on the contention window.

In a seventeenth aspect, alone or in combination with one or more of the first through sixteenth aspects, selecting the contention window includes selecting the contention window based at least in part on at least one of: a packet delay budget, or a hybrid automatic repeat request budget.

In an eighteenth aspect, alone or in combination with one or more of the first through seventeenth aspects, selecting the contention window includes selecting the contention window based at least in part on at least one of a quantity of transmissions of the particular packet, or a quantity of resources to be reserved.

In a nineteenth aspect, alone or in combination with one or more of the first through eighteenth aspects, process 600 includes determining that the set of resources is not available in the contention window; reselecting a control exclusion value based at least in part on determining that the set of resources is not available in the contention window; and reattempting to determine the set of resource candidates based at least in part on reselecting the control exclusion value.

In a twentieth aspect, alone or in combination with one or more of the first through nineteenth aspects, reselecting the control exclusion value includes increase scaling of the control exclusion value by a configured amount, linearly scaling of the control exclusion value, or selecting the control exclusion value such that a first threshold percentage of resources are available in a second threshold percentage of contention windows for which network congestion satisfies a congestion threshold.

In a twenty-first aspect, alone or in combination with one or more of the first through twentieth aspects, the control exclusion value and feedback distance of a received sidelink control information are static.

In a twenty-second aspect, alone or in combination with one or more of the first through twenty-first aspects, process 600 includes detecting a pre-emption of the set of resource candidates, and reselecting the set of resource candidates based at least in part on detecting the pre-emption of the set of resource candidates.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
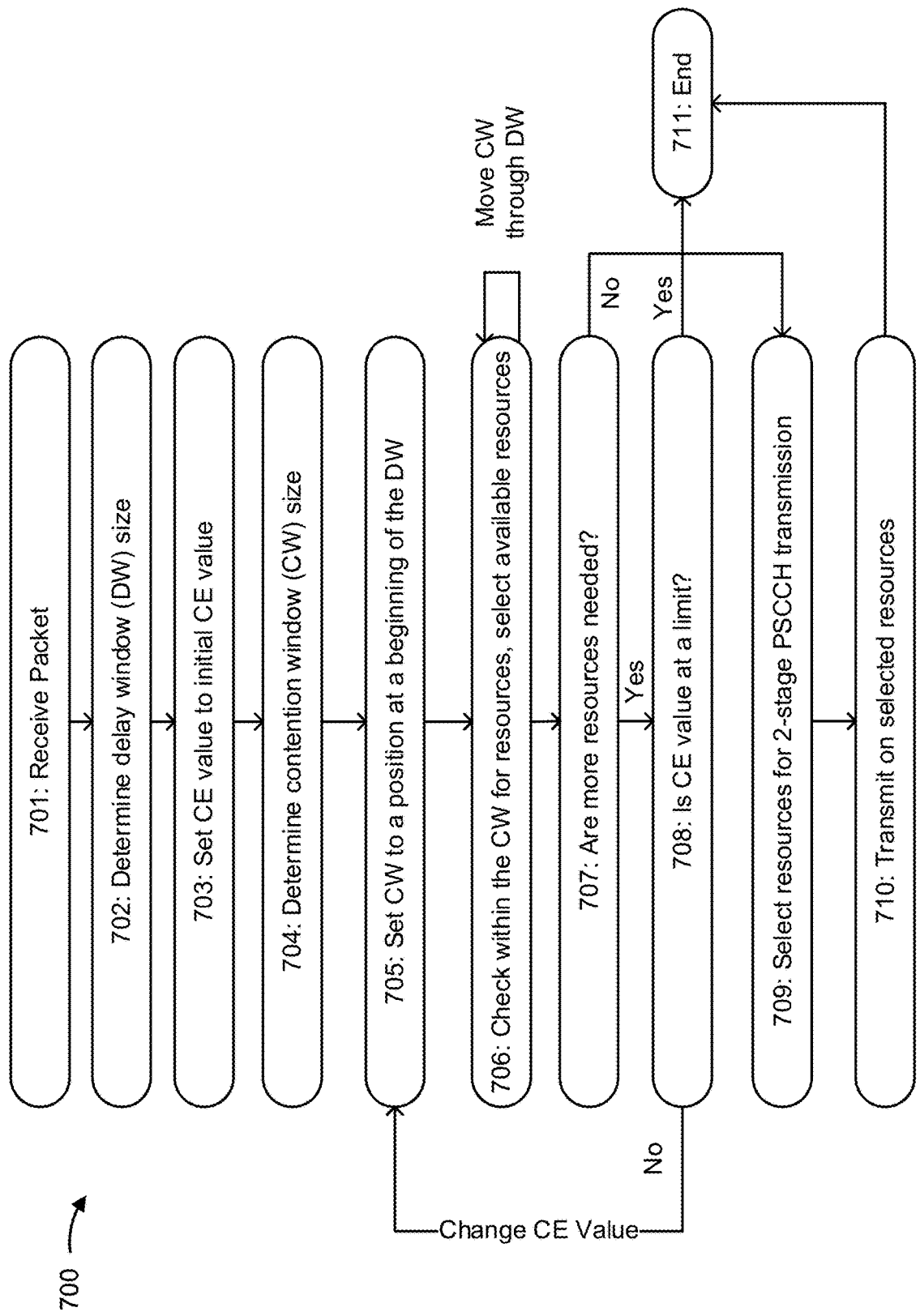
FIG. 7 is a diagram illustrating an example process performed, for example, by a user equipment, in accordance with various aspects of the present disclosure.

FIG. 7 is a diagram illustrating an example process 700 performed, for example, by a UE, in accordance with various aspects of the present disclosure. Example process 700 is an example where a UE (e.g., UE 120 and/or the like) performs operations associated with two-stage PSCCH resource candidate.

At 701, UE 120 may receive a packet. At 702, UE 120 may set the delay window (DW) size. For example, UE 120 may set the DW length to a greater of a PDB size and an HDB size. At 703, UE 120 may set a control exclusion (CE) value to an initial CE value. At 704, UE 120 may determine a contention window (CW) size (e.g., a length of the CW). For example, UE 120 may determine the CW size based on an equation CW length=minimum (PDB, HDB)/(N/K), as described above.

At 705, UE 120 may set the CW to a position at a beginning of the DW. For example, UE 120 may set the CW to a first time in the DW for sweeping through the DW to determine available resources. At 706, UE 120 may check within the CW for resources, and may select available resources. For example, if resources are available in the CW, UE 120 may attempt to select the resources.

At 707, UE 120 may determine whether more resources are needed. If yes, UE 120 may move the CW forward in time until at an end of the DW. If resources are still needed, at 708, UE 120 may determine if the CE value is at a limit. For example, UE 120 may determine if the CE value is at a maximum or a minimum value. If yes, UE 120 may end a procedure as resources are not available. If not, UE 120 may change the CE value, and may return to 705 to set the CW position to the beginning of the DW and determine whether resources are available. For example, UE 120 may increment the CE value toward the maximum or the minimum value as described above.

Returning to 707, if UE 120 determines that more resources are not needed, UE 120 may select resources for 2-stage PSCCH transmission, at 709. For example, at a particular CW, UE 120 may select resources and encode the selected resources in stage 2 of a PSCCH for transmission. At 710, UE 120 may transmit on the selected resources. At 711, UE 120 may end the procedure, having transmitted the packet on the selected resources.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    determining that a first set of resource candidates in a sidelink communication system is not available in a contention window based at least in part on a set of resource assignments for a group of other UEs in the sidelink communication system;
    selecting a control exclusion value based at least in part on determining that the first set of resources is not available in the contention window;

attempting to determine availability of a second set of resource candidates based at least in part on selecting the control exclusion value;

transmitting a first part of a physical sidelink control channel (PSCCH) transmission, wherein the first part of the PSCCH transmission does not include payload data; and transmitting a second part of the PSCCH transmission related to the first part of the PSCCH transmission for a transmission associated with medium access control (MAC) protocol data units (PDUs) of a particular packet.

2. The method of claim 1, wherein the first part of the PSCCH transmission or the second part of the PSCCH transmission indicates a resource candidate, of the second set of resource candidates, for the transmission associated with the MAC PDUs of the particular packet.

3. The method of claim 1, wherein the first part of the PSCCH transmission is a first PSCCH stage and the second part of the PSCCH transmission is a second PSCCH stage.

4. The method of claim 1, wherein a resource candidate, of the second set of resource candidates, is indicated by the second part of the PSCCH transmission for at least one of an initial transmission of the particular packet, both the initial transmission of the particular packet and a retransmission of the particular packet, or only the retransmission of the particular packet.

5. The method of claim 1, wherein the second part of the PSCCH transmission includes a resource candidate, of the second set of resource candidates, for other MAC PDUs associated with a same radio link control PDU packet as the MAC PDUs of the particular packet.

6. The method of claim 1, wherein the first part of the PSCCH transmission includes information identifying at least one of:

a demodulation reference signal (DMRS) pattern,
a modulation and coding scheme (MCS) indicator, or
a resource candidate.

7. The method of claim 1, wherein the second part of the PSCCH transmission includes at least one of payload data, feedback information, a hybrid automatic repeat request indicator, a transmission mode indicator, or a transmission distance identifier.

8. The method of claim 1, wherein the first part of the PSCCH transmission is associated with a transmission characteristic, and wherein the transmission characteristic includes one of:
less than a threshold code rate,
transparent transmit diversity,
quadrature phase shift keying modulation, or
a type 4 frequency comb pattern reference signal.

9. The method of claim 1, wherein the second part of the PSCCH transmission is associated with a transmission characteristic, and wherein the transmission characteristic includes one of:
a same data demodulation reference signal as a demodulation reference signal for the first part of the PSCCH transmission for channel estimation,
a same precoding type as the payload data, or
a quadrature phase shift keying modulation.

10. The method of claim 1, wherein the second part of the PSCCH transmission includes a resource candidate, of the second set of resource candidates, and is associated with less than a threshold code rate.

11. The method of claim 1, wherein the second part of the PSCCH transmission includes a resource candidate, of the second set of resource candidates, and wherein a link budget of the second part of the PSCCH transmission is within a threshold amount of a link budget of the first part of the PSCCH transmission.

12. The method of claim 1, wherein the second part of the PSCCH transmission is transmitted after or at the same time as the first part of the PSCCH transmission.

13. The method of claim 1, wherein the second part of the PSCCH transmission is multiplexed with a data transmission, and wherein a transport block size is based at least in part on a quantity of resource elements used for a retransmission.

14. The method of claim 1, wherein the second part of the PSCCH transmission is not multiplexed with a data transmission, and wherein the second part of the PSCCH transmission includes padding bits to cause the second part of the PSCCH transmission to occupy an entire slot.

15. The method of claim 1, wherein a frequency allocation for the second part of the PSCCH transmission is the same as the frequency allocation for the first part of the PSCCH transmission.

16. The method of claim 1, further comprising:
selecting the contention window; and
determining the first set of resource candidates for the set of resource assignments based at least in part on the contention window.

17. The method of claim 16, wherein selecting the contention window comprises:
selecting the contention window based at least in part on at least one of:
a packet delay budget, or
a hybrid automatic repeat request (HARQ) budget.

18. The method of claim 16, wherein selecting the contention window comprises:
selecting the contention window based at least in part on at least one of:
a quantity of transmissions of the particular packet, or
a quantity of resources to be reserved.

19. The method of claim ∂1, wherein selecting the control exclusion value comprises:
increasing scaling the control exclusion value by a configured amount,
linearly scaling the control exclusion value, or
selecting the control exclusion value such that a first threshold percentage of resources are available in a second threshold percentage of contention windows for which network congestion satisfies a congestion threshold.

20. The method of claim 1, wherein the control exclusion value and feedback distance of a received sidelink control information are static.

21. The method of claim 1, further comprising:
detecting a pre-emption of the first set of resource candidates; and
selecting the second set of resource candidates based at least in part on detecting the pre-emption of the first set of resource candidates.

22. The nethod of claim 1, wherein the first part of the PSCCH transmission includes an indication that the first part of the PSCCH transmission does not include the payload data.

23. A user equipment (UE) for wireless communication, comprising:
a memory; and
one or more processors coupled to the memory, the one or more processors configured to:

determine that a first set of resource candidates in a sidelink communication system is not available in a contention window based at least in part on a set of resource assignments for a group of other UEs in the sidelink communication system;

select a control exclusion value based at least in part on determining that the first set of resources is not available in the contention window;

attempt to determine availability of a second set of resource candidates based at least in part on selecting the control exclusion value;

transmit a first part of a physical sidelink control channel (PSCCH) transmission,
  wherein the first part of the PSCCH transmission does not include payload data; and transmit a second part of the PSCCH transmission related to the first part of the PSCCH transmission for a transmission associated with medium access control (MAC) protocol data units (PDUs) of a particular packet.

24. The UE of claim 23, wherein the first part of the PSCCH transmission or the second part of the PSCCH transmission indicates a resource candidate, of the second set of resource candidates, for the transmission associated with the MAC PDUs of the particular packet.

25. The UE of claim 23, wherein the first part of the PSCCH transmission is a first PSCCH stage and the second part of the PSCCH transmission is a second PSCCH stage.

26. The UE of claim 23, wherein the second part of the PSCCH transmission includes a resource candidate, of the second set of resource candidates, and
  wherein a link budget of the second part of the PSCCH transmission is within a threshold amount of a link budget of the first part of the PSCCH transmission.

27. A non-transitory computer-readable medium storing one or more instructions for wireless communication, the one or more instructions comprising:
  one or more instructions that, when executed by one or more processors of a user equipment (UE), cause the UE to:
    determine that a first set of resource candidates in a sidelink communication system is not available in a contention window based at least in part on a set of resource assignments for a group of other UEs in the sidelink communication system;
    select a control exclusion value based at least in part on determining that the first set of resources is not available in the contention window;
    attempt to determine availability of a second set of resource candidates based at least in part on selecting the control exclusion value;
    transmit a first part of a physical sidelink control channel (PSCCH) transmission,
      wherein the first part of the PSCCH transmission does not include payload data; and
    transmit a second part of the PSCCH transmission related to the first part of the PSCCH transmission for a transmission associated with medium access control (MAC) protocol data units (PDUs) of a particular packet.

28. The non-transitory computer-readable medium of claim 27, wherein the first part of the PSCCH transmission or the second part of the PSCCH transmission indicates a resource candidate, of the second set of resource candidates, for the transmission associated with the MAC PDUs of the particular packet.

29. An apparatus for wireless communication, comprising:
  means for determining that a first set of resource candidates in a sidelink communication system is not available in a contention window based at least in part on a set of resource assignments for a group of other apparatuses in the sidelink communication system;
  means for selecting a control exclusion value based at least in part on determining that the first set of resources is not available in the contention window;
  means for attempting to determine availability of a second set of resource candidates based at least in part on selecting the control exclusion value;
  means for transmitting a first part of a physical sidelink control channel (PSCCH) transmission,
    wherein the first part of the PSCCH transmission does not include payload data; and
  means for transmitting a second part of the PSCCH transmission related to the first part of the PSCCH transmission for a transmission associated with medium access control (MAC) protocol data units (PDUs) of a particular packet.

30. The apparatus of claim 29, wherein the first part of the PSCCH transmission or the second part of the PSCCH transmission indicates a resource candidate, of the second set of resource candidates, for the transmission associated with the MAC PDUs of the particular packet.

* * * * *